(12) United States Patent
Woecht

(10) Patent No.: US 7,690,292 B2
(45) Date of Patent: Apr. 6, 2010

(54) LINEAR DRIVE FOR A VEHICLE OCCUPANT RESTRAINT SYSTEM, ESPECIALLY FOR A BELT BUCKLE TENSIONER

(75) Inventor: Nobert Woecht, Boebingen (DE)

(73) Assignee: TRW Automotive GmbH, Alfdorf (DE)

( * ) Notice: Subject to any disclaimer, the term of this patent is extended or adjusted under 35 U.S.C. 154(b) by 233 days.

(21) Appl. No.: 11/825,688

(22) Filed: Jul. 9, 2007

(65) Prior Publication Data
US 2008/0012283 A1    Jan. 17, 2008

(30) Foreign Application Priority Data
Jul. 13, 2006    (DE)    ........................ 10 2006 032 447

(51) Int. Cl.
*F15B 15/26*    (2006.01)
(52) U.S. Cl. ......................................................... 92/19
(58) Field of Classification Search ...................... 92/19, 92/20; 280/806; 297/480
See application file for complete search history.

(56) References Cited
U.S. PATENT DOCUMENTS
3,937,487 A * 2/1976 Pech ........................... 297/480
6,250,682 B1    6/2001 Betz et al.
2004/0259672 A1    12/2004 Betz

FOREIGN PATENT DOCUMENTS
DE    29708880    10/1997
DE    10327837    1/2005

* cited by examiner

*Primary Examiner*—F. Daniel Lopez
(74) *Attorney, Agent, or Firm*—Tarolli, Sundheim, Covell & Tummino LLP

(57) ABSTRACT

A linear drive for a vehicle occupant restraint system, especially for a belt buckle tensioner, comprises a cylinder, a piston that can be moved in the cylinder and that has a locking part that is firmly connected to a traction element, and comprising at least one locking member that is arranged movably between the locking part and the inner wall of the cylinder. The locking part has at least one obliquely disposed clamping surface that is arranged in such a way that, when the traction element makes a pushing movement, the clamping surface clamps the locking member between the locking part and the cylinder.

14 Claims, 3 Drawing Sheets

LINEAR DRIVE FOR A VEHICLE OCCUPANT RESTRAINT SYSTEM, ESPECIALLY FOR A BELT BUCKLE TENSIONER

TECHNICAL FIELD

The invention relates to a linear drive for a vehicle occupant restraint system, especially for a belt buckle tensioner.

BACKGROUND OF THE INVENTION

The state of the art describes linear drives for belt buckle tensioners having a piston that is shaped onto a cable connected to the belt buckle and that is accommodated in a cylinder. The cylinder is connected to a gas generator that generates compressed gas that acts on the piston and brings about a tensioning stroke in order to eliminate the belt slack of the seatbelt system. With such a linear drive, care must be taken to ensure that the piston (and thus the belt buckle) cannot be displaced in case of pressure or impact on the belt buckle. For this purpose, the cable is normally deflected between the cylinder and the belt buckle in such a way that a great deal of friction is generated. However, this friction is a drawback during the tensioning.

The invention creates a linear drive, especially for a belt buckle tensioner, that stands out over the state of the art for its greater locking force in a pushing direction of the cable.

BRIEF SUMMARY OF THE INVENTION

According to the invention, a linear drive is provided comprising a cylinder, a piston that can be moved in the cylinder and that has a locking part that is firmly connected to a traction element and comprising at least one locking member that is arranged movably between the locking part and the inner wall of the cylinder, said locking part having at least one obliquely disposed first clamping surface that is arranged in such a way that, when the traction element makes a pushing movement, said clamping surface clamps the locking member between the locking part and the cylinder. As a result, a linear drive is created in which a pushing movement of the traction element is effectively and actively prevented in that one or more locking members, which are arranged between an oblique clamping surface of a locking part and a wall, prevent the locking part from moving. As a result, the traction element can be guided with low friction between the cylinder and the belt buckle, which has an advantageous effect on the tensioning performance.

According to a refinement of the invention, the locking part has at least one obliquely disposed second clamping surface with at least one associated locking member that is slanted in the opposite direction relative to the first clamping surface. This second, oppositely oriented clamping surface additionally prevents a possible displacement of the locking part if a pulling force is exerted on the traction element, which is especially important following an instance of tensioning if the vehicle occupant strikes the seatbelt.

An especially favorable embodiment is obtained when the first and the second clamping surfaces, as seen in a lengthwise direction of the locking part, form a continuous guide for the locking member. In this case, it is sufficient to have one locking member or one set of locking members that is guided by the clamping surfaces in such a way that the locking member prevents a movement of the locking part relative to the cylinder in response to a pushing movement as well as to a pulling movement of the traction element.

Advantageously, the piston has a mechanism that, when the piston is charged with compressed gas, prevents a clamping of the locking member between the locking part and the cylinder. Consequently, in case of a tensioning procedure in which the locking part is to be moved in the same direction as in the case of a pushing force acting on the traction element, the locking mechanism formed by the first clamping surface(s) is put out of operation so that the tensioning procedure can be carried out, in fact with relatively little force.

According to one embodiment, the mechanism has a sleeve with a pressure surface that can be moved along the traction element. The sleeve is especially arranged in such a way that it lies fundamentally against the locking part but moves relative to the locking part when the traction element makes a pushing movement.

In particular, the sleeve has a first contact surface and the locking part has a second contact surface that face each other. When pressure is applied to the sleeve, the first contact surface moves towards the second contact surface or is already lying against it, thus forming a non-positive connection.

When pressure is applied to the pressure surface, the sleeve can have or assume a position relative to the locking part in which a section of the sleeve is situated between the first clamping surface and the inner wall of the cylinder, as a result of which the first clamping surface is virtually covered.

In particular, when pressure is applied to the pressure surface, the end of the section of the sleeve facing the locking member is at a distance from the locking part that is smaller than the diameter of the locking member. Consequently, when pressure is applied to the pressure surface, the section is arranged so close to the first clamping surface, covering it, so that the locking member cannot move along the clamping surface into a position in which it is clamped between the locking part and the cylinder. Thus, the sleeve prevents a blocking of the tensioning procedure. In contrast, when a force is exerted on the traction element in the pushing direction without the sleeve being moved along with it, the locking member can move along the clamping surface and can block the movement of the locking part.

As an alternative, the sleeve has at least one recess in which the locking member is accommodated. In this manner as well, when pressure is applied to the pressure surface, the locking member is prevented from assuming a position in which it is clamped between the locking part and the cylinder. In contrast, in case of a relative movement between the locking part and the sleeve, the locking member also changes its position relative to the clamping surface, thus bringing about the desired blocking.

DETAILED DESCRIPTION OF THE PREFERRED EMBODIMENTS

Figure 1:
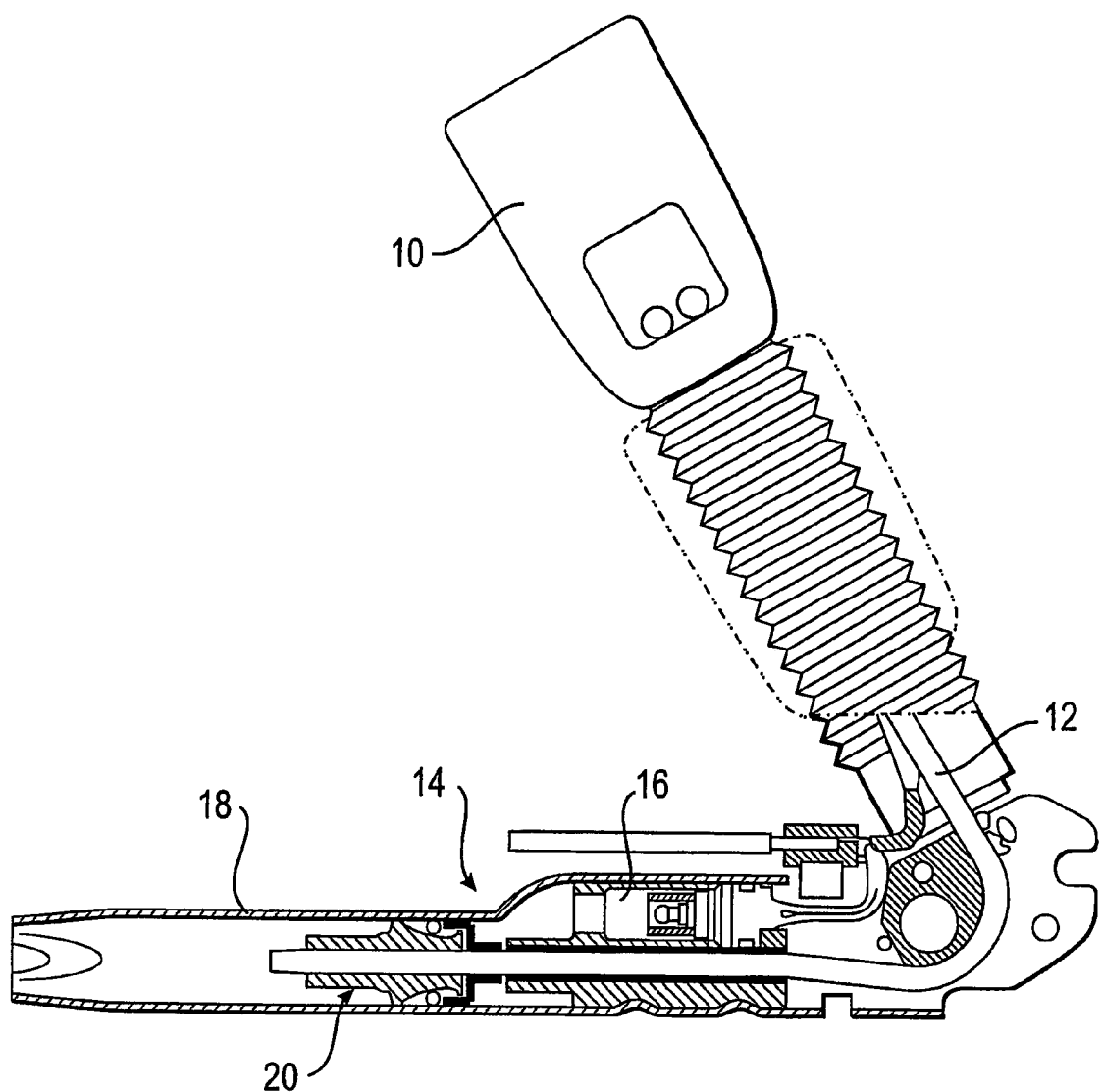
FIG. 1 shows a partially cutaway view of a belt buckle with a belt buckle tensioner that has a linear drive according to a first embodiment of the invention.

FIG. 1 shows a belt buckle 10 for a vehicle seatbelt that is coupled to a linear drive 14 via a traction element 12, here a cable, said linear drive forming a belt buckle tensioner. The linear drive 14 has a gas generator 16 that, when activated, generates compressed gas that acts on a piston 20 arranged inside a cylinder 18 (see FIG. 2). The piston 20, in turn, consists of a locking part 22 that is firmly connected to the traction element 12, as well as of a sleeve 24 that can be moved along the traction element 12.

The locking part 22 has one or more obliquely disposed first clamping surfaces 26 that (as seen from the center axis M) approach the inner wall of the cylinder in the direction of the sleeve 24. Moreover, the locking part 22 has one or more obliquely disposed second clamping surfaces 28, the first and second clamping surfaces 26, 28 forming a continuous guide as seen in the lengthwise direction of the locking part 22. The second clamping surface 28 is slanted in the opposite direction from the first clamping surface 26. Several locking members 30, here balls, are arranged movably between the locking part 22, or to put it more precisely, the clamping surfaces 26, 28, and the inner wall of the cylinder 18. In the embodiment shown, the locking part 22 is a rotation-symmetrical member, that is to say, the clamping surfaces 26, 28 are formed by an encircling, concave outer surface.

The sleeve 24 has a pressure surface 32 that faces away from the locking part 22 and that is oriented perpendicular to the inner wall of the cylinder and, opposite from the pressure surface 32, the sleeve 24 has a first contact surface 34 with which, in the installed state, it lies against a second contact surface 36 provided on the locking part 22. A tubular section 38 of the sleeve 24 facing the locking members 30 extends so far along the inner wall of the cylinder 18 in the axial direction that it covers the entire first clamping surface 26 with respect to the inner wall of the cylinder. In particular, the end of the section 38 facing the locking members 30 is at a distance from the locking part 22 that is smaller than the diameter of the locking members 30.

Figure 2:
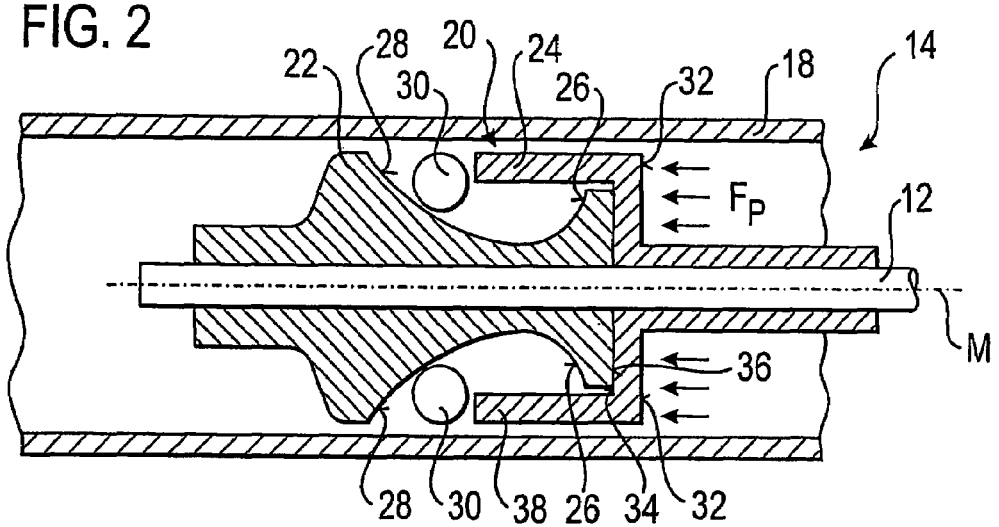
FIG. 2 shows a sectional view of the linear drive from FIG. 1 during a tensioning procedure.

During a tensioning procedure (FIG. 2), the gas generator 16 is activated and it generates compressed gas that exerts a force $F_P$ on the pressure surface 32 of the sleeve 24 and moves the latter to the left as shown in FIG. 2. Since the contact surface 34 of the sleeve 24 lies against the contact surface 36 of the locking part 22 or comes to lie there within a very short period of time, the locking part 22 is also moved along with the traction element 12 in the same direction. As a result, the belt buckle 10 is retracted to a certain extent. Since, during such a tensioning procedure, the locking members 30 are held by the section 38 of the sleeve 24 in their position shown in FIG. 2, in which they are arranged with clearance between the inner wall of the cylinder 18 and the locking part 22, the tensioning is possible with a relatively slight exertion of force. Consequently, the sleeve 24 forms a mechanism that, when compressed gas acts on the piston 20, prevents a clamping of the locking member 30 between the locking part 22 and the cylinder 18.

Figure 3:
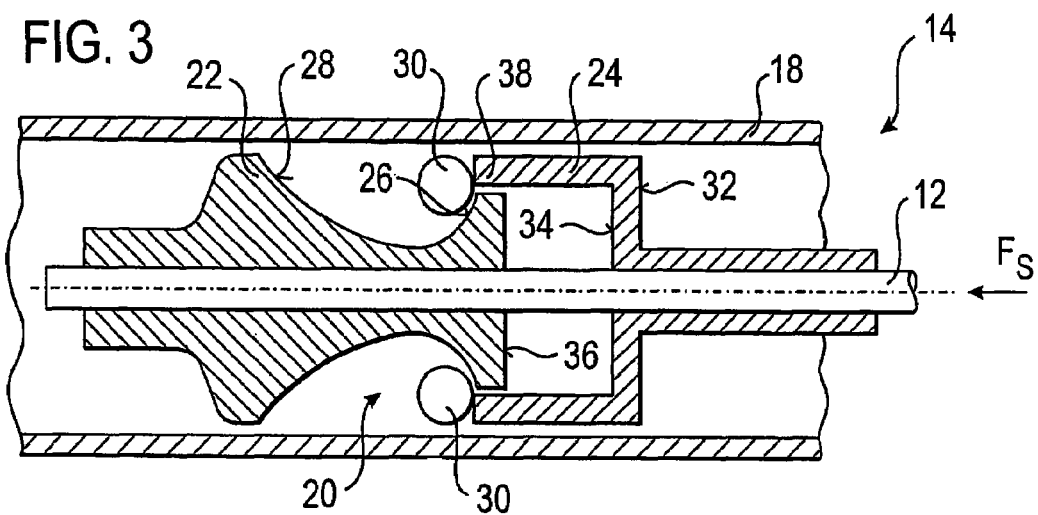
FIG. 3 shows a sectional view of the linear drive from FIG. 1 during a pushing movement of the traction element.

In contrast, if a pushing force $F_S$ is exerted on the traction element 12 (FIG. 3), the traction element 12 moves the locking part 22 relative to the sleeve 24. The locking members 30, which are now free, end up on the first clamping surface 26 due to their mass inertia, and are clamped between the locking part 22 and the cylinder 18. This results in a locking between the locking part 22 and the cylinder 18, and any further pushing movement of the traction element 12, which can alternatively be a rigid rod, is not possible.

Figure 4:
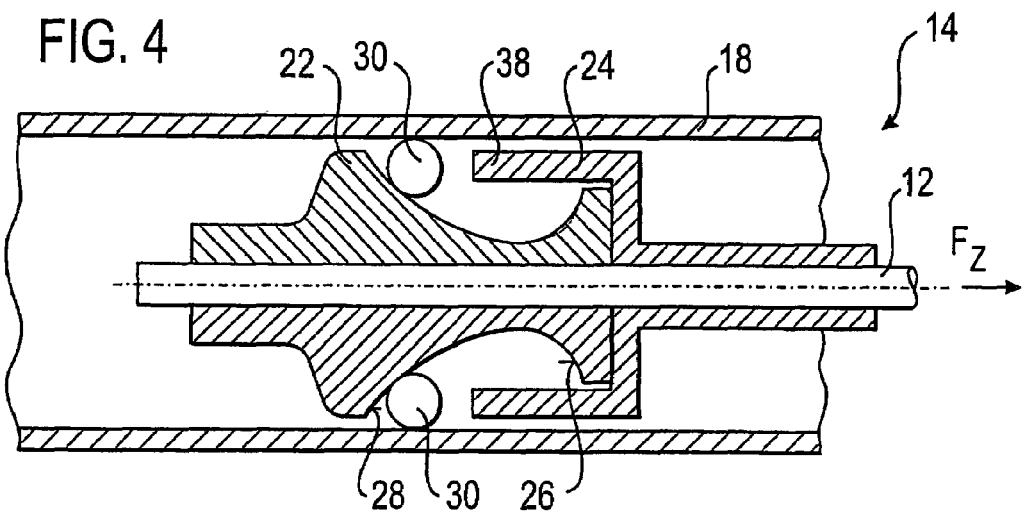
FIG. 4 shows a sectional view of the linear drive from FIG. 1 during a pulling movement of the traction element.

If, as shown in FIG. 4, a pulling force $F_Z$ is exerted onto the traction element 12, the locking members 30 end up on the obliquely disposed second clamping surface 28 and likewise bring about a locking between the locking part 22 and the cylinder 18 that prevents any further movement of the locking part 22 in this direction.

Figure 5:
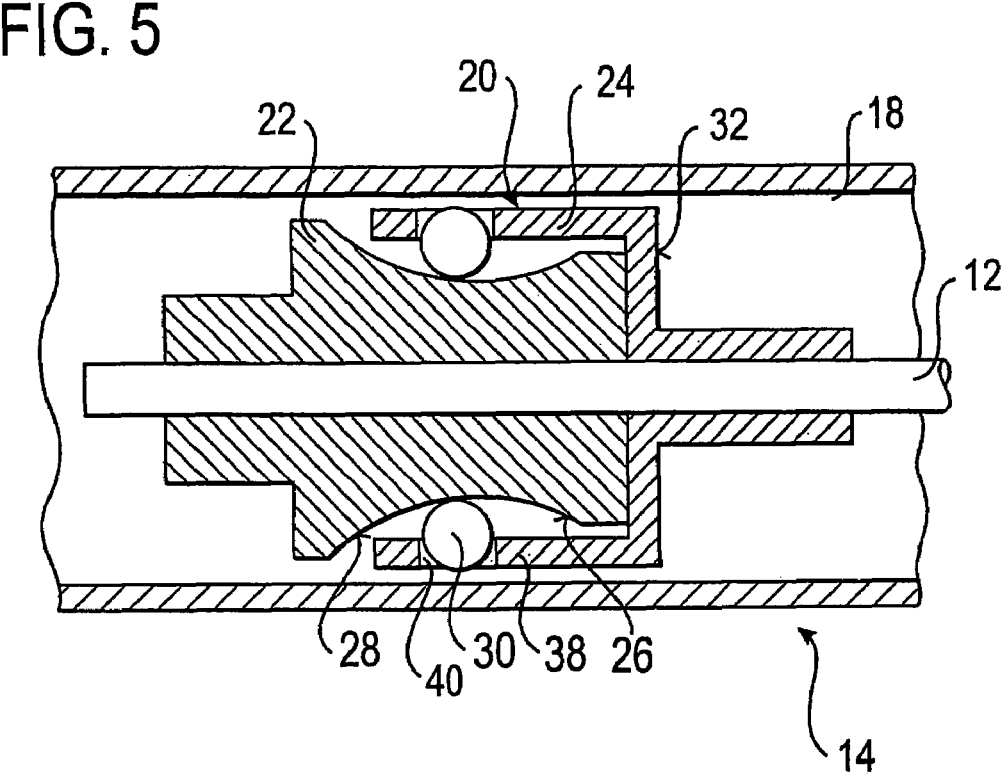
FIG. 5 shows a sectional view of a linear drive according to a second embodiment during a tensioning procedure.
Figure 6:
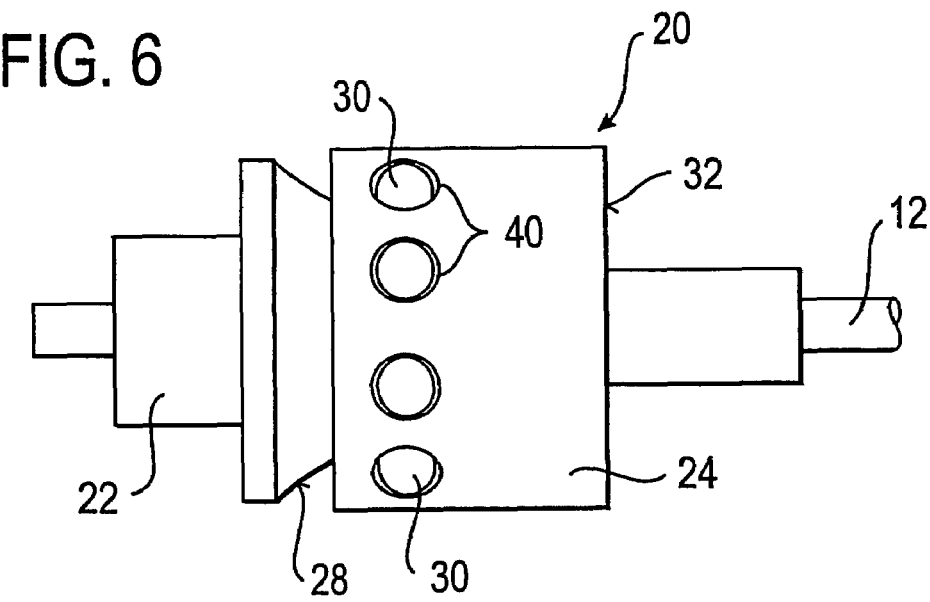
FIG. 6 shows a side view of the piston from FIG. 5.

FIGS. 5 and 6 show a second embodiment of the linear drive 14, the same or functionally equivalent components having the same reference numerals and only the differences from the previously described embodiment being discussed.

In the case of the linear drive 14 according to FIGS. 5 and 6, the sleeve 24 has several circular recesses 40 along its circumference and a locking member 30 is arranged in each of these recesses. The recesses 40 form a positive guide (similar to a ball bearing) for the locking members 30 and they are dimensioned with an oversize vis-à-vis said locking members, as a result of which the locking capability is ensured when a pulling force is exerted onto the traction element 12. Instead of being circular, the recesses can also be configured to be elongated (in the direction of movement of the locking part).

The invention claimed is:

1. A linear drive for a vehicle occupant restraint system, especially for a belt buckle tensioner, comprising
    a cylinder (18),
    a piston (20) that is selectively moved in the cylinder (18) and that has a locking part (22) that is firmly connected to a traction element (12) and
    comprising at least one locking member (30) that is arranged movably between the locking part (22) and an inner wall of the cylinder (18),
    said locking part (22) having at least one obliquely disposed first clamping surface (26) that is arranged in such a way that, when the traction element (12) makes a pushing movement, said clamping surface (26) clamps the locking member (30) between the locking part (22) and the cylinder (18), wherein the locking part (22) has at least one obliquely disposed second clamping surface (28) with at least one associated locking member (30) that is slanted in the opposite direction relative to the first clamping surface (26).

2. The linear drive according to claim 1, wherein the first and the second clamping surfaces (26, 28), as seen in a lengthwise direction of the locking part (22), form a continuous guide for the locking member (30).

3. The linear drive according to claim 2, wherein the piston (20) has a mechanism that, when the piston (20) is charged with compressed gas, prevents a clamping of the locking member (30) between the locking part (22) and the cylinder (18).

4. The linear drive according to claim 3, wherein the mechanism has a sleeve (24) with a pressure surface (32) that is selectively moved along the traction element (12).

5. The linear drive according to claim 4, wherein the sleeve (24) has a first contact surface (34) and the locking part (22) has a second contact surface (36) that face each other.

6. The linear drive according to claim 4, wherein, when pressure is applied to the pressure surface (32), the sleeve (24) has a position relative to the locking part (22) in which a section (38) of the sleeve (24) is situated between the first clamping surface (26) and the inner wall of the cylinder (18).

7. The linear drive according to claim 6, wherein, when pressure is applied to the pressure surface (32), the end of the section (38) of the sleeve (24) facing the locking member (30) is at a distance from the locking part (22) that is smaller than the diameter of the locking member (30).

8. The linear drive according to claim 1, wherein the piston (20) has a mechanism that, when the piston (20) is charged with compressed gas, prevents a clamping of the locking member (30) between the locking part (22) and the cylinder (18).

9. The linear drive according to claim 8, wherein the mechanism has a sleeve (24) with a pressure surface (32) that is selectively moved along the traction element (12).

10. The linear drive according to claim 9, wherein the sleeve (24) has a first contact surface (34) and the locking part (22) has a second contact surface (36) that face each other.

11. The linear drive according to claim 9, wherein, when pressure is applied to the pressure surface (32), the sleeve (24) has a position relative to the locking part (22) in which a section (38) of the sleeve (24) is situated between the first clamping surface (26) and the inner wall of the cylinder (18).

12. The linear drive according to claim 11, wherein, when pressure is applied to the pressure surface (32), the end of the section (38) of the sleeve (24) facing the locking member (30) is at a distance from the locking part (22) that is smaller than the diameter of the locking member (30).

13. A linear drive for a vehicle occupant restraint system, especially for a belt buckle tensioner, comprising
 a cylinder (18),
 a piston (20) that is selectively moved in the cylinder (18) and that has a locking part (22) that is firmly connected to a traction element (12) and
 comprising at least one locking member (30) that is arranged movably between the locking part (22) and an inner wall of the cylinder (18),
 said locking part (22) having at least one obliquely disposed first clamping surface (26) that is arranged in such a way that, when the traction element (12) makes a pushing movement, said clamping surface (26) clamps the locking member (30) between the locking part (22) and the cylinder (18), the piston (20) having a mechanism that, when the piston (20) is charged with compressed gas, prevents a clamping of the locking member (30) between the locking part (22) and the cylinder (18), the mechanism having a sleeve (24) with a pressure surface (32) that is selectively moved along the traction element (12), wherein the sleeve (24) has at least one recess (40) in which the locking member (30) is accommodated.

14. The linear drive according to claim 13, wherein the sleeve (24) has a first contact surface (34) and the locking part (22) has a second contact surface (36) that face each other.

\* \* \* \* \*